United States Patent
Okada

(10) Patent No.: US 12,383,966 B2
(45) Date of Patent: Aug. 12, 2025

(54) METHOD FOR MANUFACTURING SCREW ROTOR

(71) Applicant: DAIKIN INDUSTRIES, LTD., Osaka (JP)

(72) Inventor: Tadashi Okada, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 18/898,194

(22) Filed: Sep. 26, 2024

(65) Prior Publication Data

US 2025/0018458 A1 Jan. 16, 2025

Related U.S. Application Data

(63) Continuation of application No. PCT/JP2023/011066, filed on Mar. 22, 2023.

(30) Foreign Application Priority Data

Mar. 28, 2022 (JP) .................................. 2022-051247

(51) Int. Cl.
*B23C 3/32* (2006.01)
*B21H 5/00* (2006.01)
(Continued)

(52) U.S. Cl.
CPC ............... *B23C 3/32* (2013.01); *B21H 5/005* (2013.01); *F04C 18/16* (2013.01); *B23C 3/18* (2013.01);
(Continued)

(58) Field of Classification Search
CPC .. B21H 5/005; B23C 3/32; B23C 3/18; B23C 2220/32; B23C 2220/605; F04C 18/16; F04C 25/02
See application file for complete search history.

(56) References Cited

U.S. PATENT DOCUMENTS 1,601,551 A * 9/1926 Abramsen ................. B21B 1/16
  72/99
5,598,618 A * 2/1997 Aquino ................... F04C 18/52
  409/56
(Continued)

FOREIGN PATENT DOCUMENTS

JP          4229213 B1      2/2009

OTHER PUBLICATIONS

International Preliminary Report of corresponding PCT Application No. PCT/JP2023/011066 dated Oct. 10, 2024.
(Continued)

*Primary Examiner* — Ryan J. Walters
(74) *Attorney, Agent, or Firm* — GLOBAL IP COUNSELORS, LLP

(57) ABSTRACT

A plurality of helical grooves are formed in a workpiece having a cylindrical shape. Each of grooves is divided into a first portion including an end portion on a first end side of the workpiece and a second portion including an end portion on a second end side of the workpiece. A method of manufacturing a screw rotor of a screw compressor includes attaching a first end of the workpiece to a holder of a machine tool, finishing the first portion of each of the plurality of helical grooves by cutting, detaching the workpiece from the holder, attaching a second end of the workpiece detached from the holder to the holder, and finishing the second portion of each of the plurality of helical grooves by cutting.

9 Claims, 13 Drawing Sheets

(51) Int. Cl.
*F04C 18/16* (2006.01)
*B23C 3/18* (2006.01)
(52) U.S. Cl.
CPC .... *B23C 2220/32* (2013.01); *B23C 2220/605* (2013.01)

(56) References Cited

U.S. PATENT DOCUMENTS

| | | | | |
|---|---|---|---|---|
| 7,008,201 | B2 * | 3/2006 | Heizer | F04C 29/0028 418/104 |
| 7,216,407 | B2 * | 5/2007 | Yonemaru | B23B 27/145 29/888.023 |
| 2011/0097232 | A1 | 4/2011 | Miyamura et al. | |

OTHER PUBLICATIONS

International Search Report of corresponding PCT Application No. PCT/JP2023/011006 dated Apr. 25, 2023.
European Search Report of corresponding EP Application No. 23 77 9887.1 dated May 20, 2025.

* cited by examiner

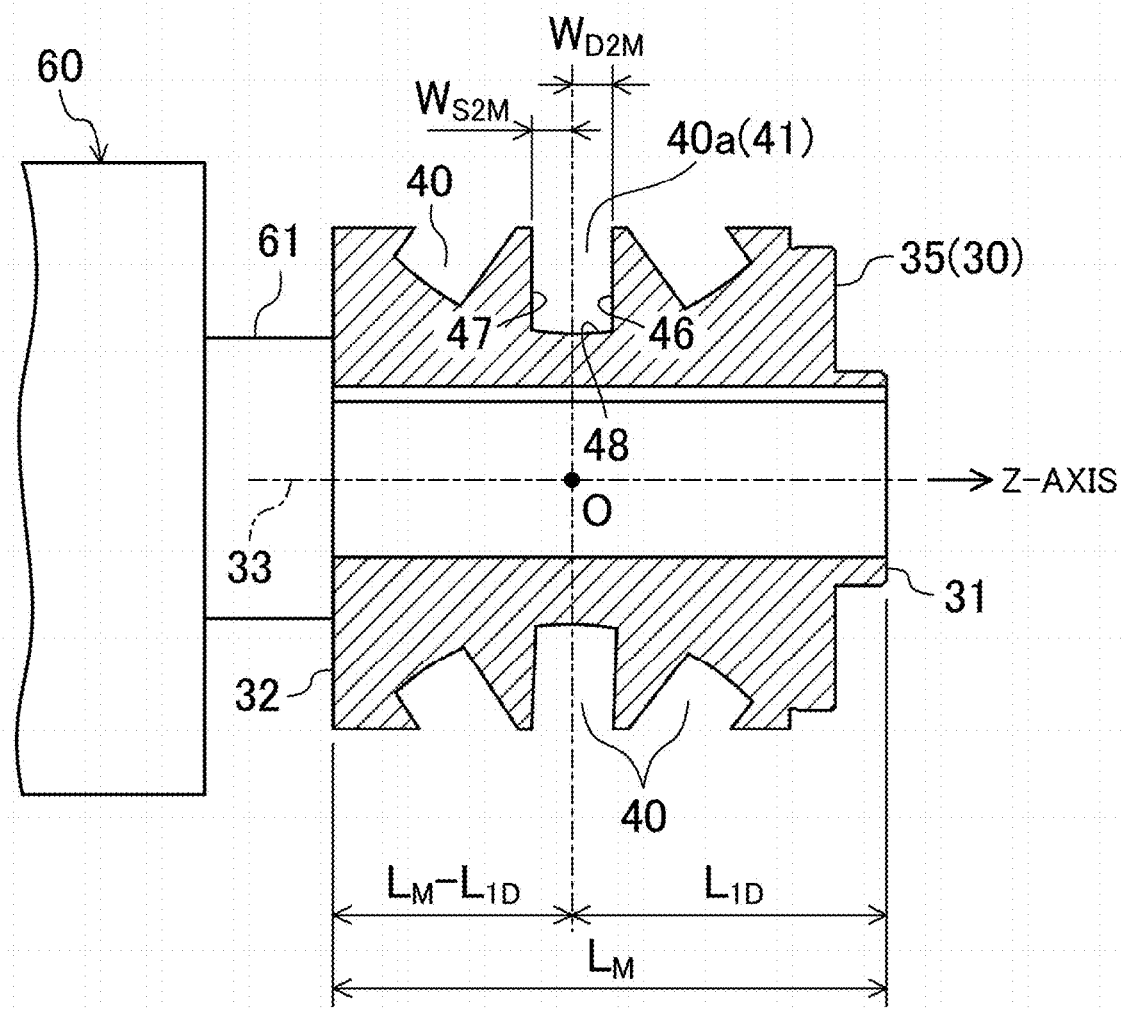

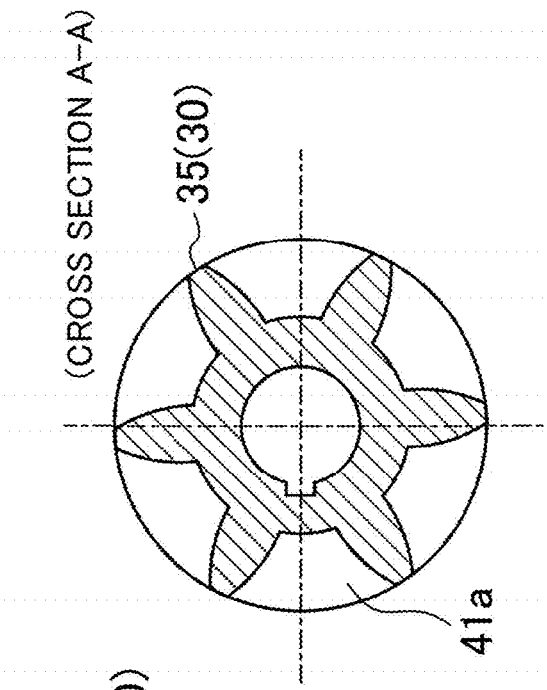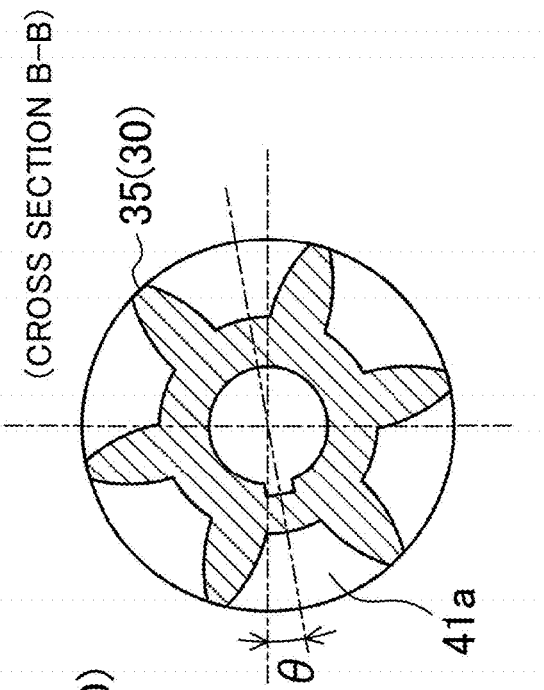
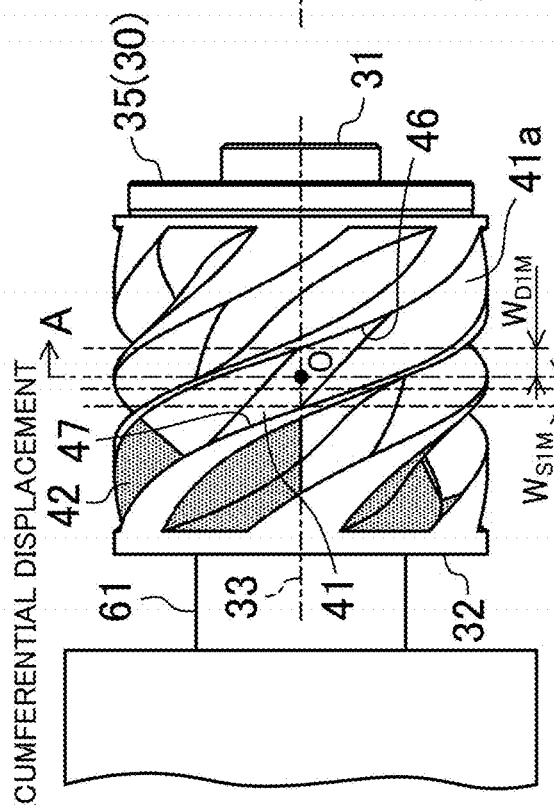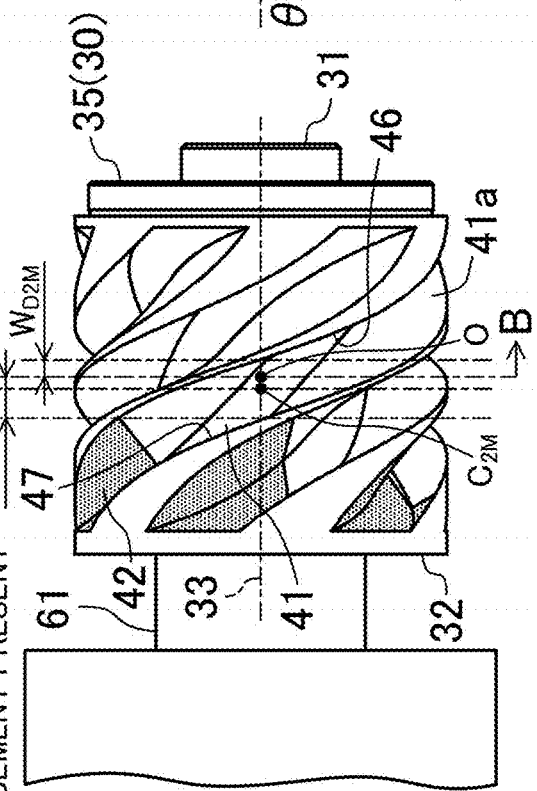
FIG. 13A  FIG. 13B

METHOD FOR MANUFACTURING SCREW ROTOR

CROSS-REFERENCE TO RELATED APPLICATIONS

This is a continuation of International Application No. PCT/JP2023/011066 filed on Mar. 22, 2023, which claims priority to Japanese Patent Application No. 2022-051247, filed on Mar. 28, 2022. The entire disclosures of these applications are incorporated by reference herein.

BACKGROUND

Technical Field

The present disclosure relates to a method for manufacturing a screw rotor, a screw rotor, and a screw compressor.

Background Art

Japanese Patent No. 4229213 describes that a screw rotor for a screw compressor is manufactured by using a 5-axis machining center. In a 5-axis machining center, a workpiece is cut while a cutting tool, such as an end mill, attached to a rotary spindle and the workpiece attached to a holder are both moved.

SUMMARY

Helical grooves that are formed in a screw rotor are grooves each having a shape in which the depth thereof gradually decreases from a center portion of the screw rotor toward the two end portions of the screw rotor in the axial direction of the screw rotor. Thus, when one end of a workpiece is fixed to a holder, the angle formed by a rotation center axis of a cutting tool and a center axis of the workpiece decreases during machining of a portion of each helical groove, the portion being near the other end of the workpiece, and the holder holding the workpiece approaches a rotary spindle that holds the cutting tool.

On the other hand, in a 5-axis machining center, it is necessary to avoid interference between a rotary spindle that holds a cutting tool and a holder that holds a workpiece. Thus, in the related art, in order to machine a screw rotor, it is necessary to use a special 5-axis machining center having a structure in which a holder does not come into contact with a rotary spindle even when machining a portion of each helical groove near the other end of a workpiece.

An object of the present disclosure is to perform machining of a screw rotor by using a machine tool having a general structure.

A first aspect of the present disclosure is a method for manufacturing a screw rotor for a screw compressor by forming a plurality of helical grooves in a workpiece having a cylindrical shape. Each of the plurality of helical grooves is divided into a first portion including an end portion on a first end side of the workpiece and a second portion including an end portion on a second end side of the workpiece. The method includes a first attachment step of attaching a first end of the workpiece to a holder of a machine tool, a first finishing step of finishing the first portion of each of the plurality of helical grooves by cutting after completion of the first attachment step, a detachment step of detaching the workpiece from the holder after completion of the first finishing step, a second attachment step of attaching a second end of the workpiece detached from the holder in the detachment step to the holder, and a second finishing step of finishing the second portion of each of the plurality of helical grooves by cutting after completion of the second attachment step.

BRIEF DESCRIPTION OF THE DRAWINGS

FIG. 12 is a cross-sectional view of the screw rotor taken along line XII-XII of FIG. 11.

FIG. 13A and FIG. 13B include a front view and a cross-sectional view of the screw rotor that is to be subjected to a second measurement step.

DETAILED DESCRIPTION OF EMBODIMENT(S)

An embodiment will now be described. The configuration of a single-screw compressor (10) will be described below first, and then a method for manufacturing a screw rotor (30) will be described.

Single-Screw Compressor

The single-screw compressor (10) (hereinafter simply referred to as "screw compressor") of the present embodiment is provided in a refrigerant circuit of a refrigeration apparatus that performs a vapor compression refrigeration cycle. The screw compressor (10) draws in and compresses refrigerant that has been evaporated in an evaporator and discharges the compressed refrigerant toward a condenser. In addition, the screw compressor (10) performs two-stage compression.

Overall Configuration of Screw Compressor

Figure 1:
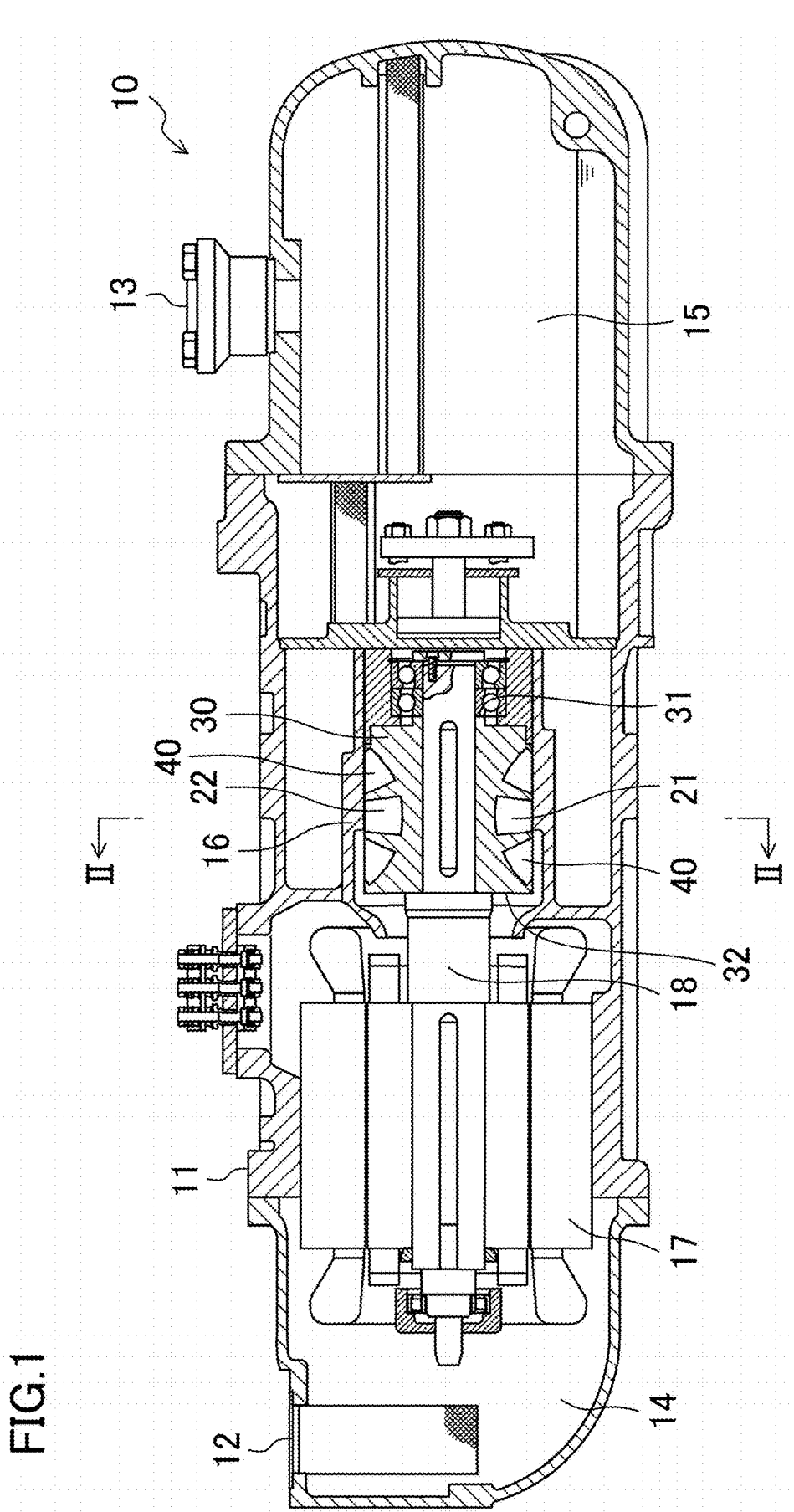
FIG. 1 is a schematic longitudinal sectional view of a single-screw compressor.
Figure 2:
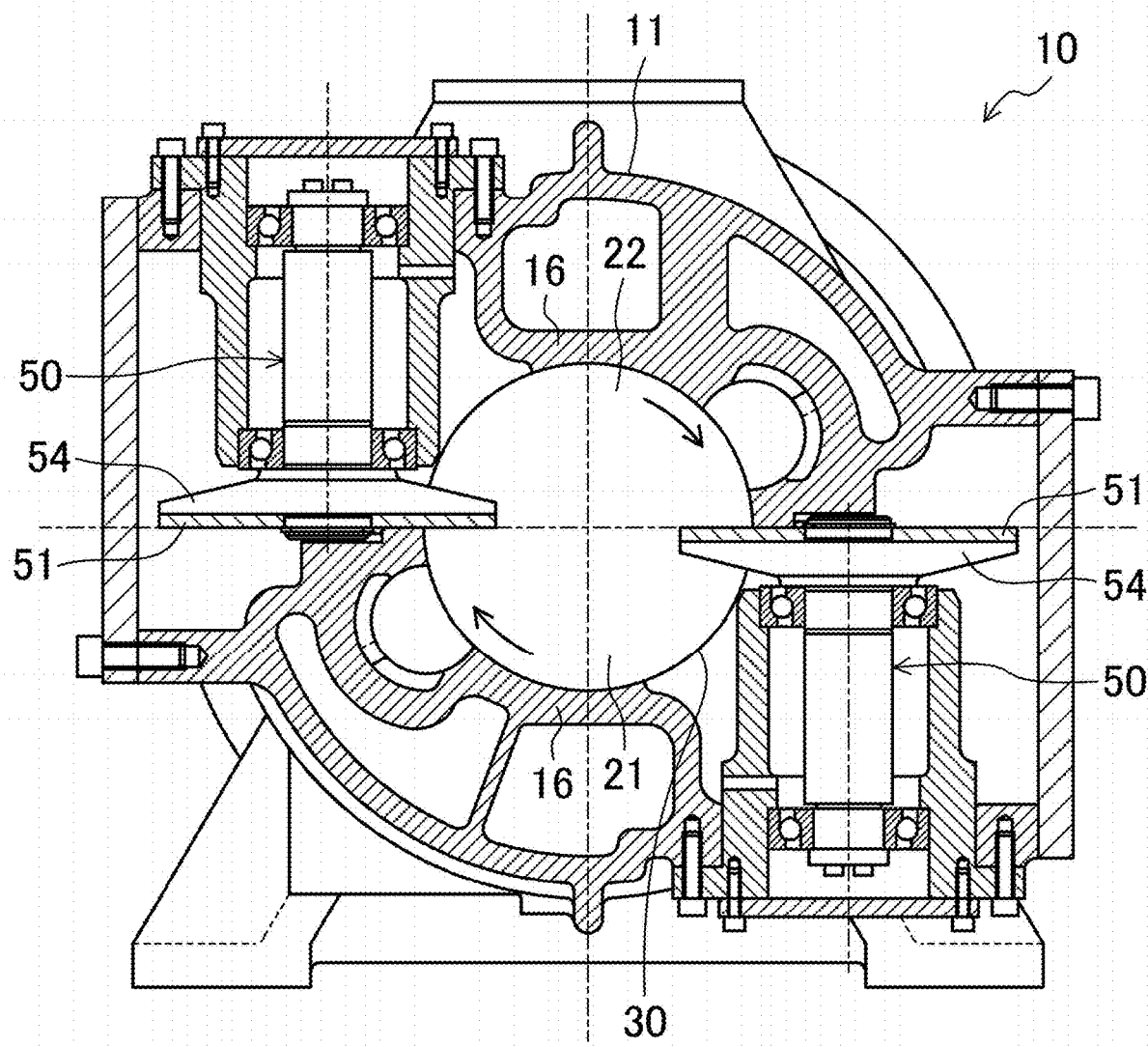
FIG. 2 is a cross-sectional view of the single-screw compressor taken along line II-II of FIG. 1.

As illustrated in FIG. 1 and FIG. 2, the screw compressor (10) includes a single screw rotor (30) and two gate rotor assemblies (50). The screw compressor (10) further includes a casing (11), an electric motor (17), and a drive shaft (18).

As illustrated in FIG. 1, the casing (11) is formed in a cylindrical shape with both ends closed. The casing (11) is positioned such that the longitudinal direction thereof is a substantially horizontal direction. The casing (11) includes a cylindrical portion (16). The cylindrical portion (16) is a portion that is formed in a cylindrical shape. The cylindrical portion (16) is positioned in the vicinity of the center of the casing (11) in the longitudinal direction. The screw rotor (30) is accommodated in the cylindrical portion (16).

The casing (11) has a suction port (12) and a discharge port (13). The suction port (12) is formed at an upper portion of a first end portion (a left end portion in FIG. 1) of the casing (11). The discharge port (13) is formed in an upper portion of a second end portion (a right end portion in FIG. 1) of the casing (11).

The casing (11) includes a low-pressure chamber (14) and a high-pressure chamber (15) each formed therein. The low-pressure chamber (14) is formed to be closer to the first end of the casing (11) than the cylindrical portion (16) is and communicates with the suction port (12). The high-pressure chamber (15) is formed to be closer to the second end of the casing (11) than the cylindrical portion (16) is and communicates with the discharge port (13).

The electric motor (17) is disposed in the low-pressure chamber (14). The drive shaft (18) connects the electric motor (17) and the screw rotor (30) to each other. The electric motor (17) drives the screw rotor (30) so that the screw rotor (30) rotates.

As illustrated in FIG. 2, each of the gate rotor assemblies (50) includes a single gate rotor (51) and a single support (54). Each of the gate rotor assemblies (50) is a member that is made of a resin and that has a flat plate-like shape. Each of the supports (54) is a member made of a metal. Each of the supports (54) is provided so as to be in contact with a rear surface of the corresponding gate rotor (51) and supports the gate rotor (51).

In FIG. 2, in one of the gate rotor assemblies (50) that is located on the right-hand side of the screw rotor (30), a front surface of the gate rotor (51) faces upward. In addition, in FIG. 2, in the other of the gate rotor assemblies (50) that is located on the left-hand side of the screw rotor (30), a front surface of the gate rotor (51) faces downward.

Screw Rotor

Figure 3:
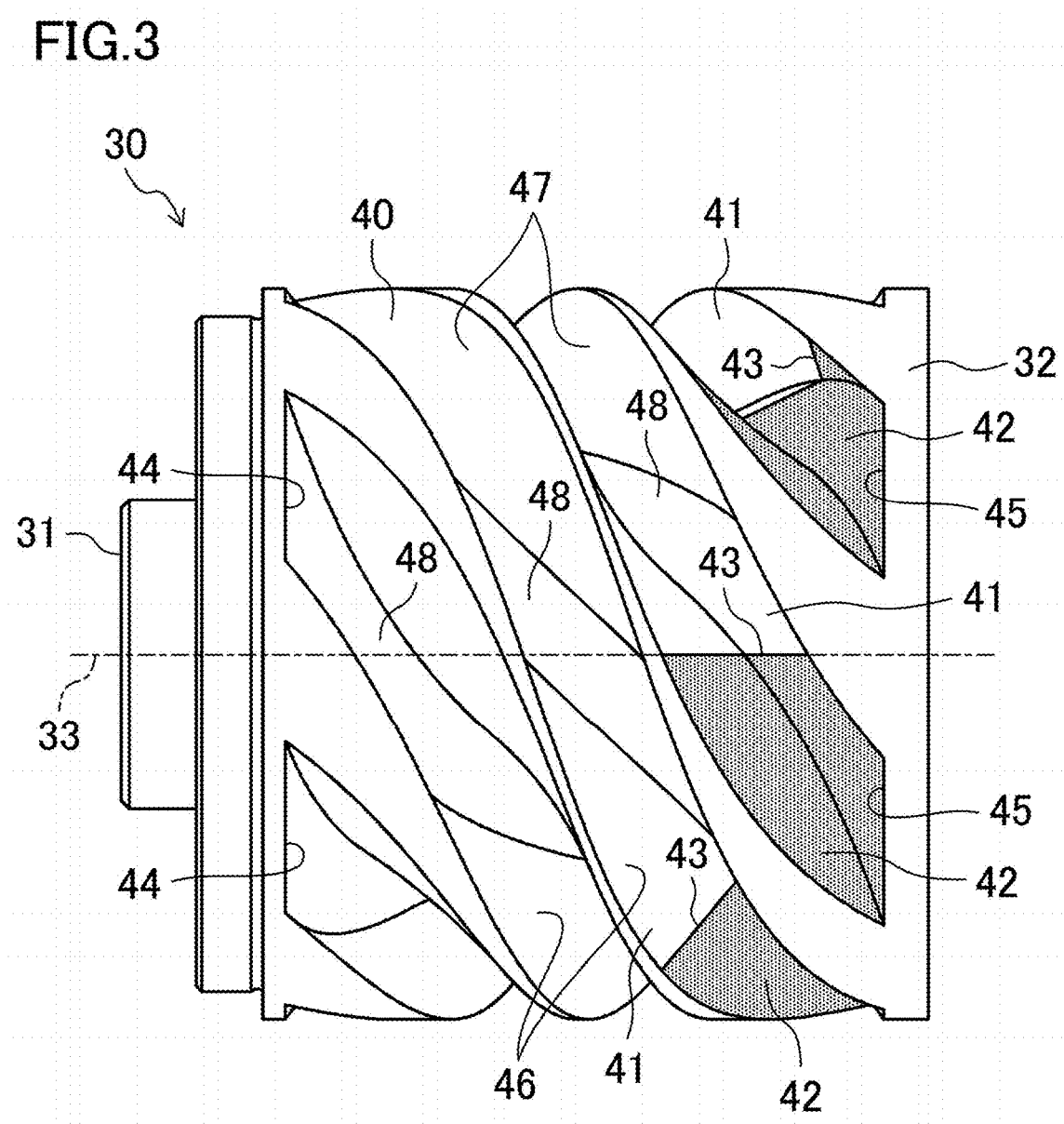
FIG. 3 is a front view of the screw rotor.

As illustrated in FIG. 3, the screw rotor (30) is a member that is made of a metal and that has a cylindrical shape. A left end of the screw rotor (30) in FIG. 3 will be referred to as a first end (31), and a right end of the screw rotor (30) in FIG. 3 will be referred to as a second end (32). In the cylindrical portion (16) of the casing (11), the first end (31) of the screw rotor (30) is located closer to the high-pressure chamber (15), and the second end (32) of the screw rotor (30) is located closer to the low-pressure chamber (14).

The screw rotor (30) has a plurality of (six in the present embodiment) helical grooves (40). The helical grooves (40) are grooves that extend in a helical manner in a direction in which a center axis (33) of the screw rotor (30) extends. The six helical grooves (40) are arranged at equal angular intervals in the circumferential direction of the screw rotor (30). The helical grooves (40) are open only at the outer peripheral surface of the screw rotor (30). Therefore, in the screw rotor (30) of the present embodiment, each of the helical grooves (40) is not open at an end surface of the screw rotor (30).

Each of the helical grooves (40) of the screw rotor (30) has a first side wall surface (46), a second side wall surface (47), and a bottom wall surface (48). The first side wall surface (46) and the second side wall surface (47) face each other. The first side wall surface (46) is located closer to the first end (31) of the screw rotor (30). The second side wall surface (47) is located closer to the second end (32) of the screw rotor (30).

In each of the helical grooves (40), an end closer to the first end (31) of the screw rotor (30) will be referred to as a discharge-side end (44), and an end closer to the second end (32) of the screw rotor (30) will be referred to as a suction-side end (45). The depth of each of the helical grooves (40) gradually increases from each of the suction-side end (45) and the discharge-side end (44) toward the center in the direction in which the center axis (33) of the screw rotor (30) extends. In addition, the depth of each of the helical grooves (40) is zero at both the suction-side end (45) and the discharge-side end (44).

Each of the helical grooves (40) is divided into a first portion (41) and a second portion (42). In FIG. 3, the second portion (42) of each of the helical grooves (40) is indicated by half-tone shading. In each of the helical grooves (40), the first portion (41) is a portion including the discharge-side end (44). The second portion (42) is a portion including the suction-side end (45). The length of the first portion (41) in a direction in which the helical groove (40) extends (the direction from the suction-side end (45) toward the discharge-side end (44)) is longer than the length of the second portion (42) in the direction in which the helical groove (40) extends.

In each of the helical grooves (40), a boundary line (43) that is a boundary between the first portion (41) and the second portion (42) is formed on the wall surfaces. This boundary line (43) includes slight steps (e.g., about 10 μm to about 30 μm each) that are formed on the wall surfaces of the helical groove (40). It is desirable that the steps constituting the boundary line (43) be as small as possible. However, it is impossible to completely eliminate machining errors, and thus, it is not feasible to reduce the steps to zero.

In each of the helical grooves (40), the boundary line (43) formed on the wall surfaces is inclined at a small angle (e.g., about 1 degree to about 3 degrees) with respect to the line of intersection of the wall surfaces of the helical groove (40) and a seal plane (55). The seal plane (55) will be described later.

Gate Rotor

Figure 4:
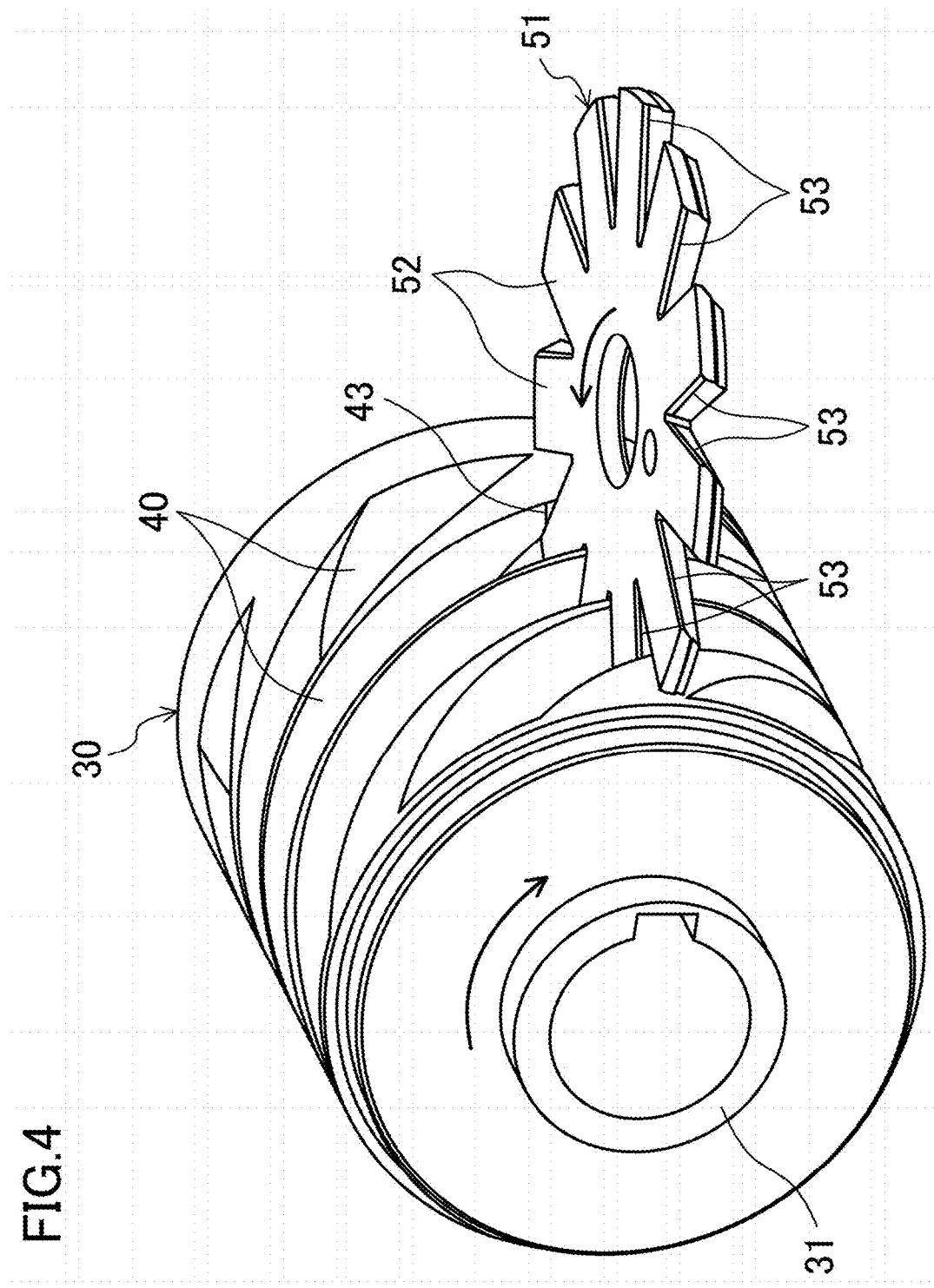
FIG. 4 is a perspective view of the screw rotor and a gate rotor, illustrating the arrangement of the screw rotor and the gate rotor in the single-screw compressor.

As illustrated in FIG. 4, each of the gate rotors (51) includes a plurality of (11 in the present embodiment) gates (52) that are radially arranged. Each of the gates (52) is a substantially rectangular flat plate-shaped portion. The gates (52) enter the helical grooves (40) of the screw rotor (30) and slide on the wall surfaces of the helical grooves (40) so as to form compression chambers (21, 22).

Figure 6:
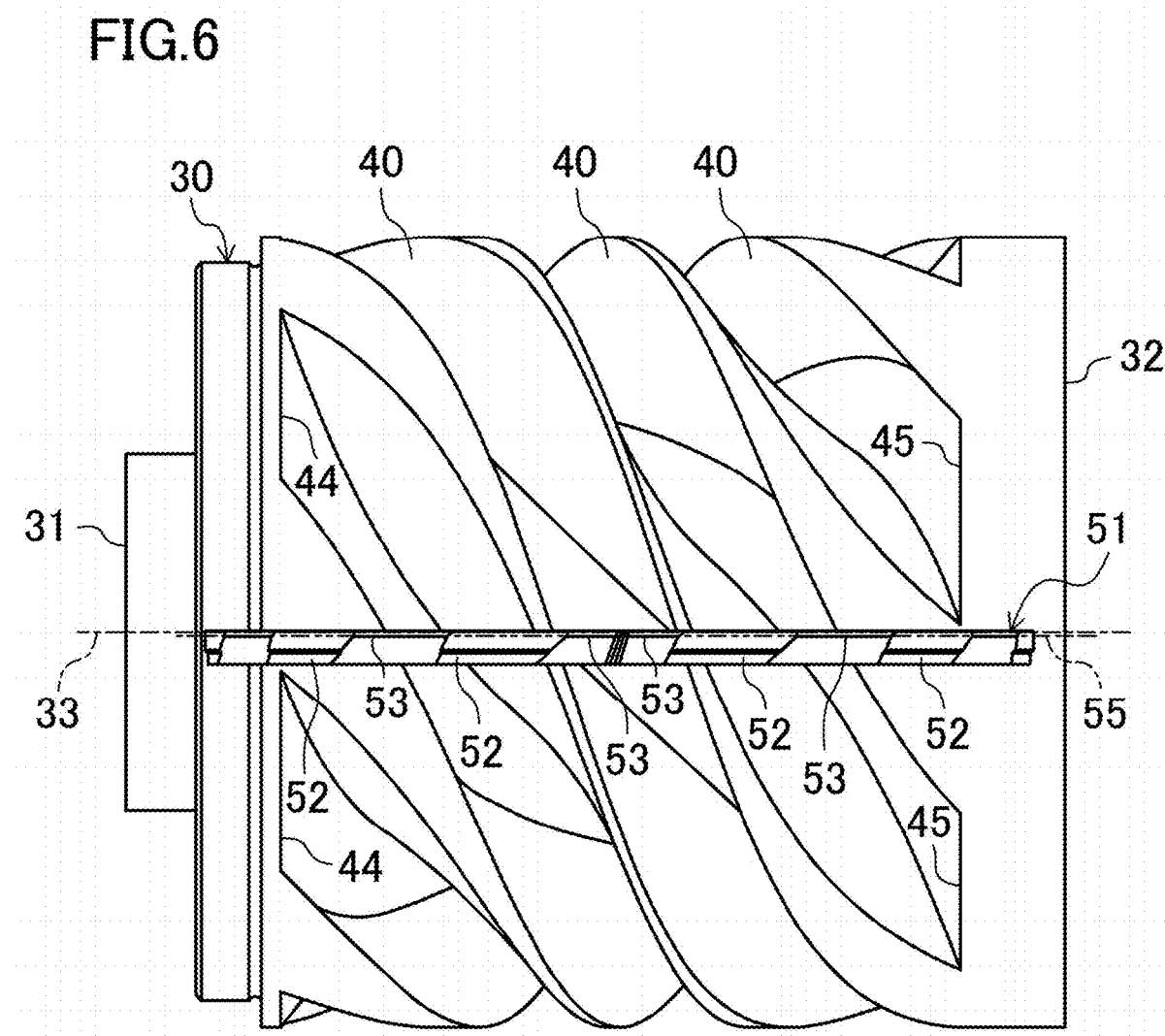
FIG. 6 is a front view of the screw rotor and the gate rotor, illustrating the arrangement of the screw rotor and the gate rotor in the single-screw compressor.

As illustrated also in FIG. 6, seal lines (53) are formed on side surfaces of each of the gates (52). Each of the seal lines (53) is a linear region extending from a base end of the corresponding gate (52) toward a tip end of the gate (52). When one of the gates (52) enters one of the helical grooves (40), the corresponding seal lines (53) slide along the wall surfaces of the helical groove (40).

In each of the gate rotors (51), the seal lines (53) of all the gates (52) are located on a single plane. The plane on which all the seal lines (53) of the gate rotor (51) are located is the seal plane (55). The seal plane (55) is a plane that is offset by a predetermined distance S (e.g., 1 mm to 2 mm) from the front surface of the gate rotor (51).

Figure 5:
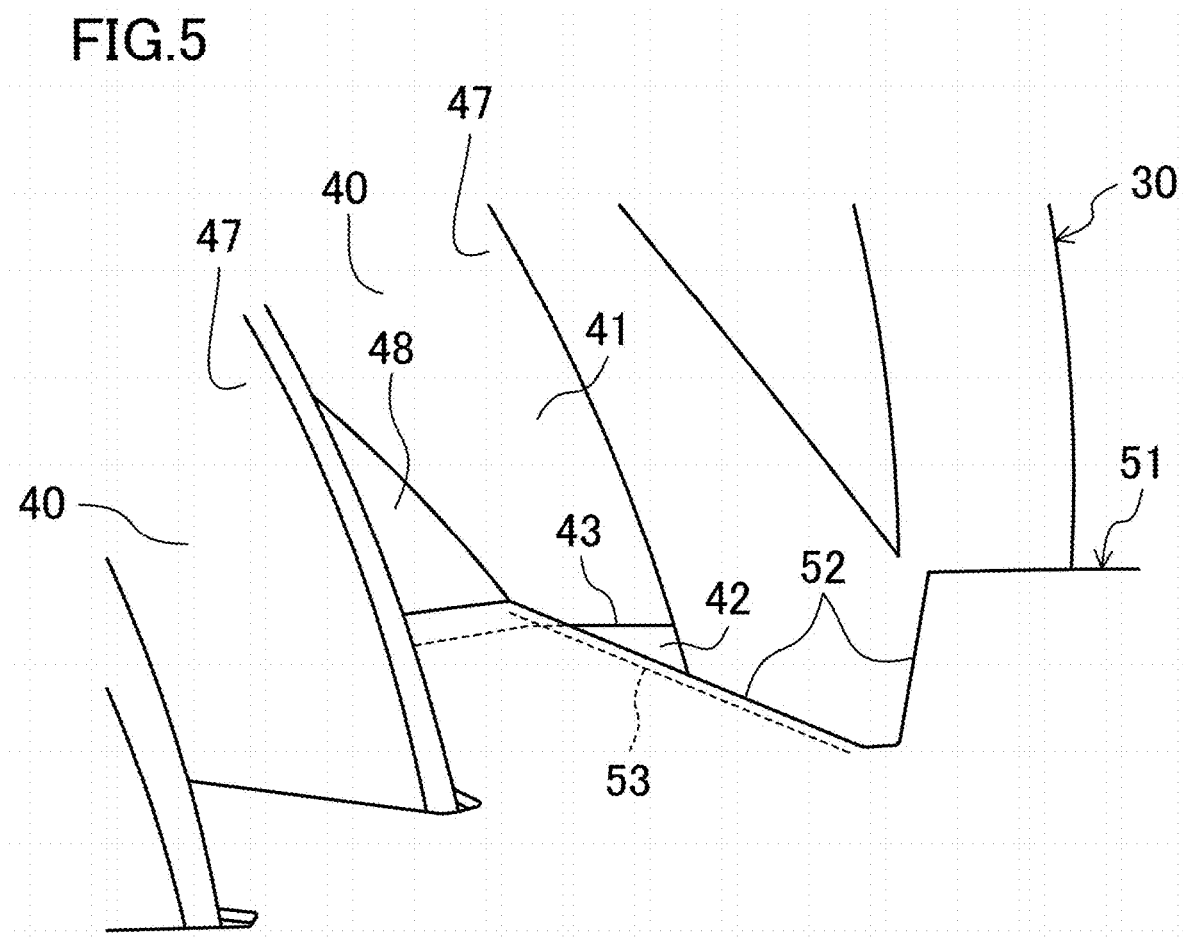
FIG. 5 is an enlarged view of a principal portion of FIG. 4.

As mentioned above, in each of the helical grooves (40), the boundary line (43) formed on the wall surfaces is inclined with respect to the line of intersection of the wall surfaces of the helical groove (40) and the seal plane (55). Thus, as illustrated in FIG. 5, during the process in which one of the gates (52) crosses the boundary line (43) of one of the helical grooves (40) by moving from the second portion (42) toward the first portion (41), the seal lines (53) of the gate (52), which move relatively from the suction-side end (45) to the discharge-side end (44) of the helical groove (40), each intersect the boundary line (43) at a single point. In this manner, in the screw rotor (30) of the present embodiment, in each of the helical grooves (40), the boundary line (43) formed on the wall surfaces is shaped to intersect with the seal lines (53) of one of the gates (52) passing through the boundary line (43) by moving from the suction-side end (45) toward the discharge-side end (44) of the helical groove (40).

Compression Chamber

As illustrated in FIG. 1 and FIG. 2, in the screw compressor (10), the screw rotor (30), the gate rotors (51), and the cylindrical portion (16) of the casing (11) form the compression chambers (21, 22). The compression chambers (21, 22) are closed spaces that are surrounded by the wall surfaces of the helical grooves (40) of the screw rotor (30), the front surfaces of the gates (52) of the gate rotors (51), and the inner peripheral surface of the cylindrical portion (16). In the screw compressor (10) of the present embodiment, the compression chamber that is located below the screw rotor (30) in FIG. 2 corresponds to the first compression chamber (21), and the compression chamber that is located above the screw rotor (30) in FIG. 2 corresponds to the second compression chamber (22).

Operation of Screw Compressor

In the screw compressor (10), the screw rotor (30) is driven by the electric motor (17). When the screw rotor (30) rotates, the gate rotors (51) meshing with the screw rotor (30) rotate. When the gate rotors (51) rotate, the gates (52) of the gate rotors (51) enter the helical grooves (40) of the screw rotor (30) and relatively move from the suction-side ends (45) of the helical grooves (40) that the gates (52) have entered toward the discharge-side ends (44) of the helical grooves (40). As a result, the volumes of the compression chambers (21, 22) are gradually reduced, and the refrigerant in the compression chambers (21, 22) is compressed.

The screw compressor (10) of the present embodiment performs two-stage compression. More specifically, the refrigerant that has flowed in the low-pressure chamber (14) through the suction port (12) flows into the first compression chamber (21) and is compressed. The refrigerant compressed in the first compression chamber (21) is discharged from the first compression chamber (21) and flows into the second compression chamber (22) through a passage that is formed in the casing (11). The refrigerant that has flowed in the second compression chamber (22) is compressed and then discharged to the high-pressure chamber (15). The refrigerant that has flowed in the high-pressure chamber (15) is discharged to the outside of the screw compressor (10) through the discharge port (13).

Method for Manufacturing Screw Rotor

A method for manufacturing the screw rotor of the present embodiment will now be described.

Figure 7:
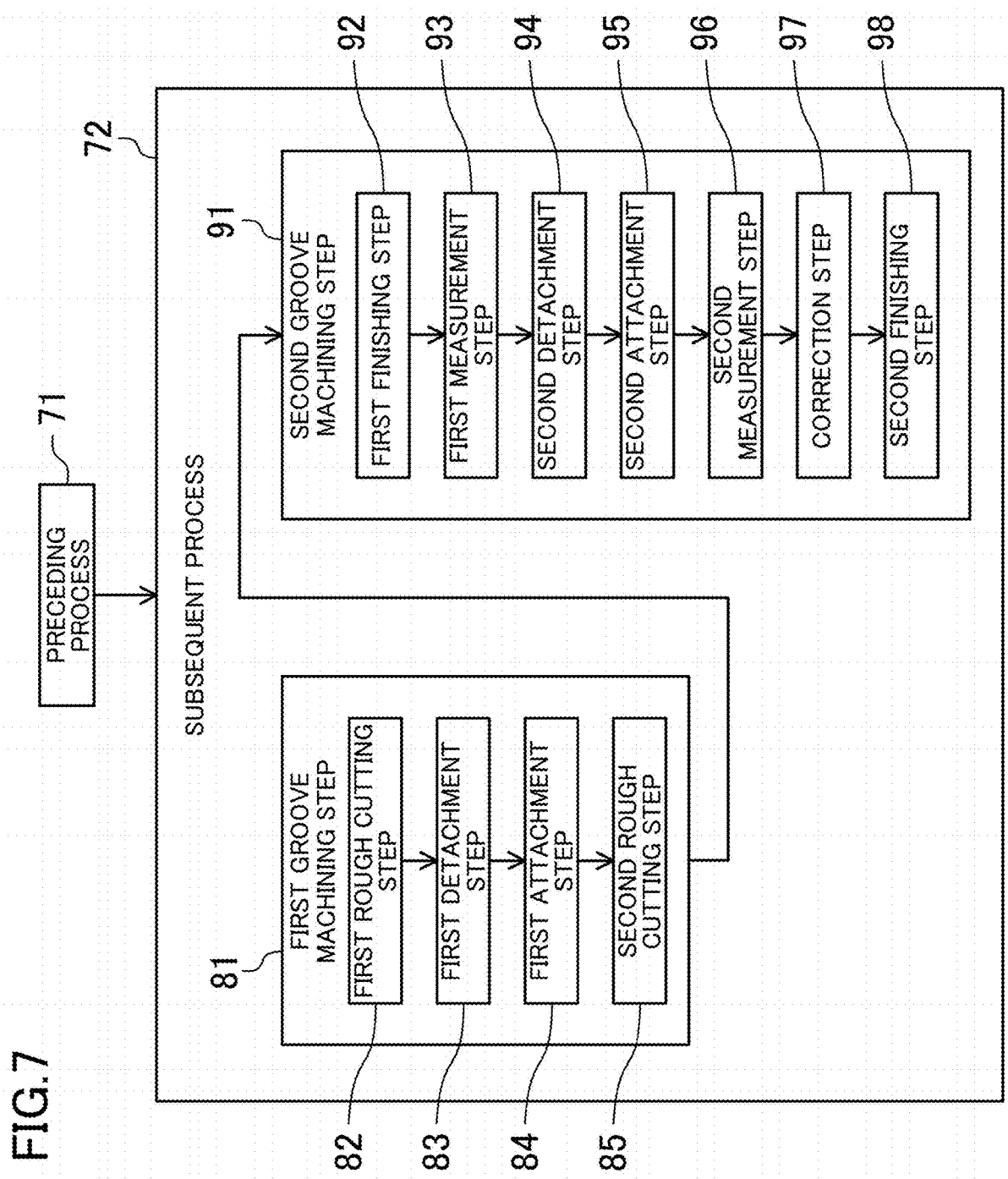
FIG. 7 is a diagram illustrating steps of a method for manufacturing the screw rotor.

As illustrated in FIG. 7, in the manufacturing method according to the present embodiment, a preceding process (71) and a subsequent process (72) are sequentially performed. In the subsequent process (72), a first groove machining step (81) and a second groove machining step (91) are sequentially performed. In the first groove machining step (81), a first rough cutting step (82), a first detachment step (83), a first attachment step (84), and a second rough cutting step (85) are sequentially performed. In the second groove machining step (91), a first finishing step (92), a first measurement step (93), a second detachment step (94), a second attachment step (95), a second measurement step (96), a correction step (97), and a second finishing step (98) are sequentially performed.

Preceding Process

In the preceding process (71), an outer peripheral surface and an end surface of a workpiece (35), which is a casting, are cut. Machining of the workpiece (35) in the preceding process (71) is performed by using a lathe. In the preceding process (71), the workpiece (35) is machined such that an outer diameter of the workpiece (35) and the entire length of the workpiece (35) meet the design values of the screw rotor (30). In addition, in the preceding process (71), the workpiece (35) is also machined to have a hole through which the drive shaft (18) is to be inserted.

Subsequent Process

In the subsequent process (72), machining is performed to form the helical grooves (40) in the workpiece (35) that has been machined in the preceding process (71). The machining of the workpiece (35) in the subsequent process (72) is performed by using a 5-axis machining center that serves as a machine tool (60). In the subsequent process (72), the workpiece (35) that is attached to a holder (61) of the machine tool (60) is machined by using an end mill (63) that is attached to a rotary spindle (62) of the machine tool (60).

In the first groove machining step (81), machining is performed to form the helical grooves (40) in the workpiece (35) that has a cylindrical shape. In the second groove machining step (91), a finishing step is performed on the first side wall surfaces (46), the second side wall surfaces (47), and the bottom wall surfaces (48) of the helical grooves (40) such that the shapes of the helical grooves (40) meet the design values of the screw rotor (30). In the second groove machining step (91), swarf machining in which the workpiece (35) is cut by using a side surface of the end mill (63) is performed.

Note that, in the following description, an end portion of the workpiece (35) that will become the first end (31) of the screw rotor (30), which is a finished product, will be referred to as the first end (31) of the workpiece (35). Another end portion of the workpiece (35) that will become the second end (32) of the screw rotor (30), which is the finished product, will be referred to as the second end (32) of the workpiece (35).

First Rough Cutting Step

The first rough cutting step (82) is performed in a state where the second end (32) of the workpiece (35) is attached to the holder (61) of the machine tool (60). In the first rough cutting step (82), a portion of each of the helical grooves (40), the portion including the suction-side end (45), is formed by cutting. Note that, in each of the helical grooves (40), the length (the length in the direction in which the helical groove (40) extends) of the portion that is formed in the first rough cutting step (82) may be the same as or different from that of the second portion (42) of the corresponding helical groove (40) of the screw rotor (30), which is the finished product.

First Detachment Step

In the first detachment step (83), the workpiece (35) is detached from the holder (61) of the machine tool (60) after completion of the first rough cutting step (82).

First Attachment Step

In the first attachment step (84), the workpiece (35) detached from the holder (61) of the machine tool (60) in the first detachment step (83) is attached to the holder (61) again. In the first attachment step (84), the first end (31) of the workpiece (35) is attached to the holder (61) of the machine tool (60).

Second Rough Cutting Step

In the second rough cutting step (85), machining is performed on the workpiece (35) attached to the holder (61) of the machine tool (60) in order to form an unformed portion of each of the helical grooves (40). In the second rough cutting step (85), the portions of the helical grooves (40) that have not been formed in the first rough cutting step (82) are formed. The workpiece (35) has all the helical grooves (40) fully formed therein at the point when the second rough cutting step (85) is complete.

First Finishing Step

Figure 8:
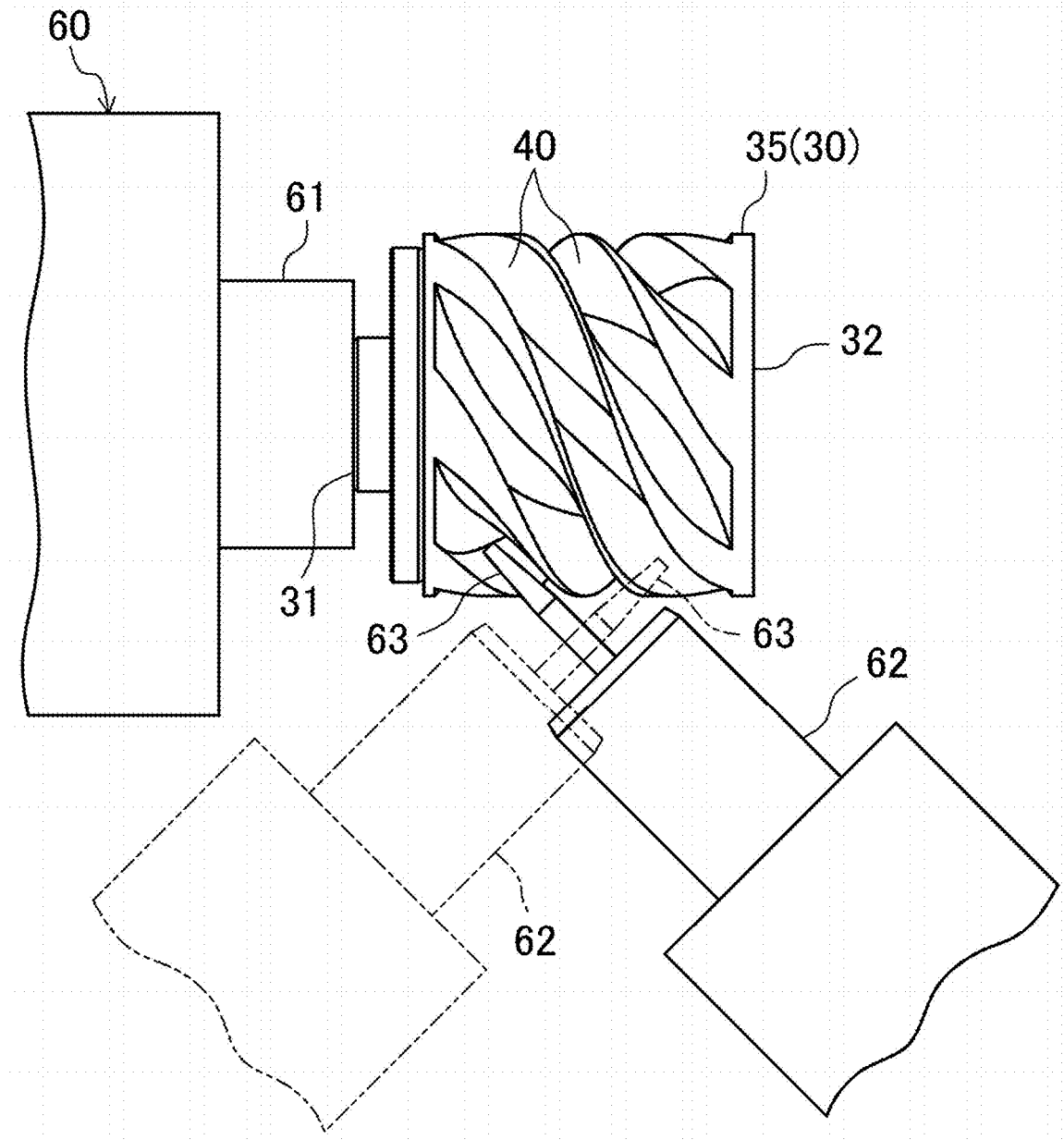
FIG. 8 is an explanatory diagram illustrating the relative positions of a holder and a rotary spindle in a machine tool when machining the screw rotor by using the machine tool.

As illustrated in FIG. 8, in the first finishing step (92), the workpiece (35) having the first end (31) attached to the holder (61) of the machine tool (60) is subjected to cutting to form the first portions (41) of the helical grooves (40) such that the shape of each of the first portions (41) meets the design values of the screw rotor (30). In the first finishing step (92), rough machining, semi-finishing, and finishing are sequentially performed.

In the first finishing step (92), the machine tool (60) cuts the workpiece (35), which is attached to the holder (61), while varying the relative positions of the workpiece (35) and the end mill (63), which is attached to the rotary spindle (62).

As indicated by a solid line in FIG. 8, in the machine tool (60), the holder (61) and the rotary spindle (62) are separated from each other when machining a portion of each of the helical grooves (40), the portion being located near the first end (31) of the workpiece (35) attached to the holder (61). In contrast, as indicated by a two-dot chain line in FIG. 8, in the machine tool (60), the distance between the holder (61) and the rotary spindle (62) decreases as a portion that is cut by the end mill (63) comes closer to the second end (32) of the workpiece (35).

Thus, in the first finishing step (92), the wall surfaces of the first portions (41) of the helical grooves (40), each of the first portions (41) being a portion located on the first end (31) side of the workpiece (35), are subjected to cutting. Consequently, the workpiece (35) is machined by the machine tool (60) in the first finishing step (92) without interference between the holder (61) and the rotary spindle (62).

Figure 10:
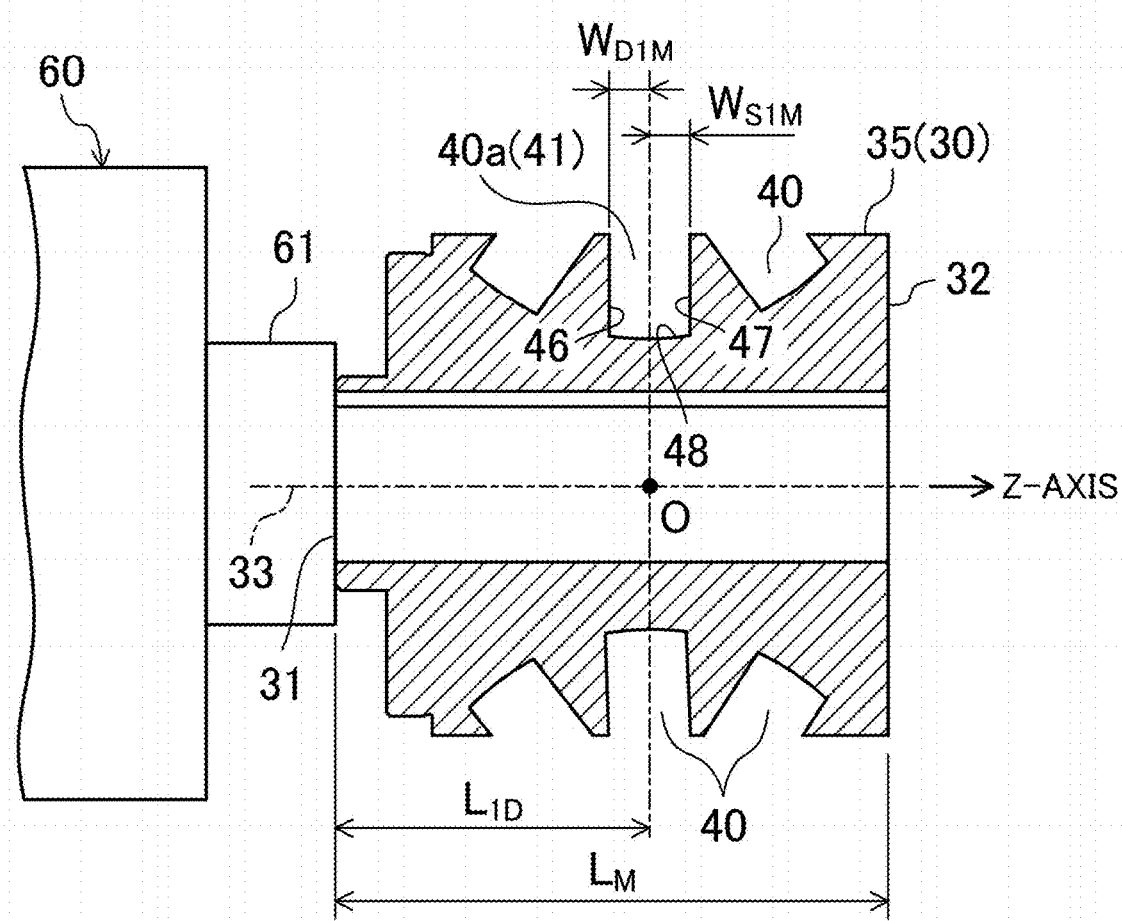
FIG. 10 is a cross-sectional view of the screw rotor taken along line X-X of FIG. 9.

FIG. 10 illustrates a cross section of the workpiece (35) at the point when the machining in the first finishing step (92) has been completed. This cross section of the workpiece (35) is a cross section in a plane that is offset by a distance S from the center axis (33) of the workpiece (35). In each of the gate rotors (51), the distance S is an offset amount of the seal plane (55) with respect to the front surface of the gate rotor (51).

In the first finishing step (92), the cutting of the workpiece (35) is performed with a point O in FIG. 10 as the origin of the Z-axis. The origin O of the Z-axis is located on the center axis (33) of the workpiece (35), which is attached to the holder (61) of the machine tool (60). In addition, the origin O of the Z-axis is a point that is located at a distance $L_{1D}$ from an end surface of the holder (61). The length $L_{1D}$ is determined from the design values of the screw rotor (30).

One of the helical grooves (40) that is located at the center on the upper side in FIG. 10 is defined as a specific helical groove (40a). In the first finishing step (92), the wall surfaces (46, 47, 48) of the first portion (41) of each of the helical grooves (40) is machined with the aim of setting the Z-axis coordinate of a widthwise midpoint of the specific helical groove (40a) in the cross section illustrated in FIG. 10 to zero. Note that the Z-axis is a coordinate axis that coincides with the center axis (33) of the workpiece (35), which is attached to the holder (61) of the machine tool (60).

First Measurement Step

Figure 9:
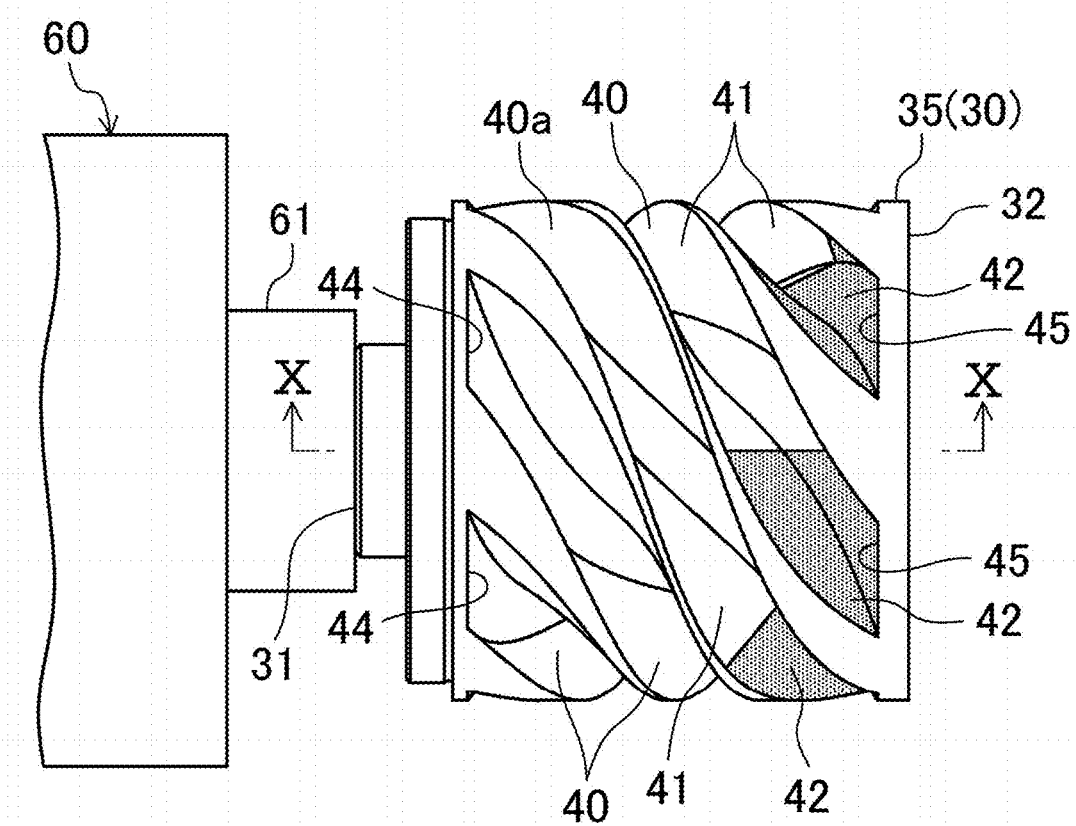
FIG. 9 is a front view of the screw rotor attached to the holder of the machine tool in a first attachment step.

In the first measurement step (93), the workpiece (35) that has undergone the first finishing step (92) and that has the first end (31) attached to the holder (61) of the machine tool (60) is a measurement target, and the position of the first portion (41) of the specific helical groove (40a) in the direction in which the center axis (33) of the workpiece (35) extends (the Z-axis direction) is measured. Here, the first measurement step (93) will be described with reference to FIG. 9 and FIG. 10. FIG. 10 illustrates a cross section of the workpiece (35) illustrated in FIG. 9.

In the first measurement step (93), a total length $L_M$ of the workpiece (35) is measured. Note that the measurement of the total length $L_M$ of the workpiece (35) may be performed between the completion of the preceding process (71) and the start of the first measurement step (93).

In addition, in the first measurement step (93), the Z-axis coordinates of the wall surfaces of the first portion (41) of the specific helical groove (40a) in the cross section illustrated in FIG. 10 are each measured as an indicator for determining the position of the first portion (41) of the specific helical groove (40a). A measured value of the Z-axis coordinate of the first side wall surface (46) of the specific helical groove (40a) illustrated in FIG. 10 is defined as "$-W_{D1M}$", and a measured value of the Z-axis coordinate of the second side wall surface (47) of the specific helical groove (40a) illustrated in FIG. 10 is defined as "$W_{S1M}$". If there is no machining error, then $W_{S1M}=W_{D1M}$ is satisfied. However, it is practically impossible to achieve zero machining error, and thus, $W_{S1M} \neq W_{D1M}$ is satisfied.

In the cross section illustrated in FIG. 10, the Z-axis coordinate at the widthwise center of the specific helical groove (40a) is defined as a coordinate value $C_{1M}$. The coordinate value $C_{1M}$ is $(W_{S1M}-W_{D1M})/2 (C_{1M}=(W_{S1M}-W_{D1M})/2)$. If there is no machining error, the coordinate value $C_{1M}$ is zero. However, since it is practically impossible to achieve zero machining error, the coordinate value $C_{1M} \neq 0$ (zero).

Second Detachment Step

In the second detachment step (94), the workpiece (35) is detached from the holder (61) of the machine tool (60) after completion of the first measurement step (93).

Second Attachment Step

Figure 11:
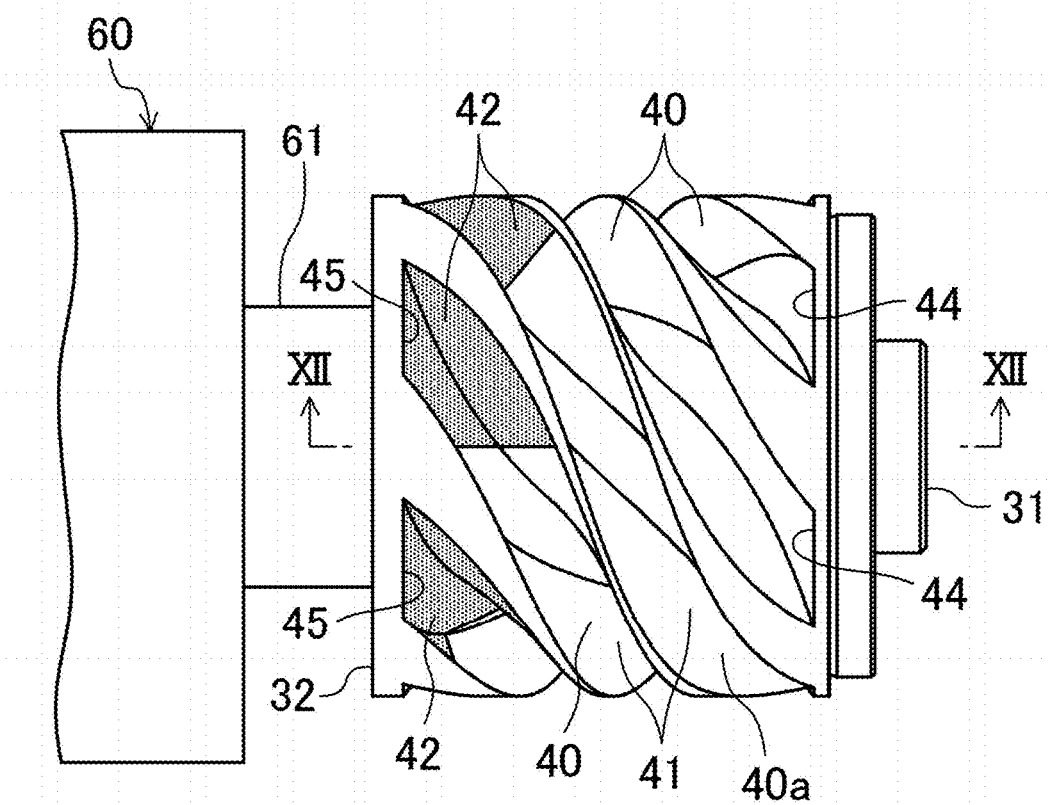
FIG. 11 is a front view of the screw rotor attached to the holder of the machine tool in a second attachment step.

In the second attachment step (95), the workpiece (35) detached from the holder (61) of the machine tool (60) in the second detachment step (94) is attached to the holder (61) again. As illustrated in FIG. 11, in the second attachment step (95), the second end (32) of the workpiece (35) is attached to the holder (61) of the machine tool (60).

Second Measurement Step

In the second measurement step (96), the workpiece (35) that has the second end (32) attached to the holder (61) of the machine tool (60) in the second attachment step (95) is a measurement target, and the position of the first portion (41) of the specific helical groove (40a) in the direction in which the center axis (33) of the workpiece (35) extends (the Z-axis direction) is measured. Here, the second measurement step (96) will be described with reference to FIG. 11 and FIG. 12. FIG. 12 illustrates a cross section of the workpiece (35) illustrated in FIG. 11.

First, in the second measurement step (96), the origin O of the Z-axis is determined with respect to the workpiece (35) having the second end (32) attached to the holder (61) of the machine tool (60). More specifically, a point that is at a distance of $(L_M - L_{1D})$ from the end surface of the holder (61) is defined as the origin O of the Z-axis after completion of the second attachment step (95). As described above, $L_M$ is the actual measured total length of the workpiece (35), and $L_{1D}$ is a distance determined from the design values of the screw rotor (30).

In the second measurement step (96), the Z-axis coordinates of the wall surfaces of the first portion (41) of the specific helical groove (40a) in the cross-section illustrated in FIG. 12 are each measured as an indicator for determining the position of the first portion (41) of the specific helical groove (40a). A measured value of the Z-axis coordinate of the first side wall surface (46) of the specific helical groove (40a) illustrated in FIG. 12 is defined as "$W_{D2M}$", and a measured value of the Z-axis coordinate of the second side wall surface (47) of the specific helical groove (40a) illustrated in FIG. 12 is defined as "$-W_{S2M}$".

Correction Step

In the correction step (97), a displacement angle θ of the workpiece (35) is calculated, and correction of a machining origin in the first finishing step (92) is performed on the basis of the calculated displacement angle θ.

The displacement angle θ is an angle around the center axis (33) of the workpiece (35). The displacement angle θ indicates the amount of change in the circumferential position of the workpiece (35) at the completion of the second attachment step (95) relative to the circumferential position of the workpiece (35) at the completion of the first finishing step (92).

In the correction step (97), the displacement angle θ is calculated by using the correlation between the position of each of the helical grooves (40) in the direction in which the center axis (33) of the screw rotor (30) extends and the rotational angle of the screw rotor (30), the correlation being determined from the design values of the screw rotor (30), the position of the first portion (41) measured in the first measurement step (93), and the position of the first portion (41) measured in the second measurement step (96).

Calculation of the displacement angle θ of the workpiece (35) will be described with reference to FIG. 13A and FIG. 13B.

FIG. 13A illustrates the workpiece (35) at the point when the second attachment step (95) is complete on the assumption that the displacement angle θ is zero degrees. In this case, an absolute value $W_{D2M}$ of the Z-axis coordinate of the first side wall surface (46) of one of the helical grooves (40) in the cross section illustrated in FIG. 12 is equal to an absolute value $W_{D1M}$ of the Z-axis coordinate of the first side wall surface (46) measured in the first measurement step (93) ($W_{D2M} = W_{D1M}$). In addition, in this case, an absolute value $W_{S2M}$ of the Z-axis coordinate of the second side wall surface (47) of the helical groove (40) in the cross section illustrated in FIG. 12 is equal to an absolute value $W_{S1M}$ of the Z-axis coordinate of the second side wall surface (47) measured in the first measurement step (93) ($W_{S2M} = W_{S1M}$).

However, it is practically impossible for the circumferential position of the workpiece (35) immediately before the second detachment step (94) to completely match the circumferential position of the workpiece (35) immediately after the second attachment step (95). Therefore, in the actual manufacturing method for the screw rotor, as illustrated in FIG. 13B, $W_{D2M} \neq W_{D1M}$ is satisfied, and $W_{S2M} \neq W_{S1M}$ is satisfied.

In the cross section illustrated in FIG. 12, the Z-axis coordinate at the widthwise center of the specific helical groove (40a) is defined as a coordinate value $C_{2M}$. The coordinate value $C_{2M}$ is $(W_{D2M} - W_{S2M})/2$ ($C_{2M} = (W_{D2M} - W_{S2M})/2$). When comparing the case where there is no circumferential displacement of the workpiece (35) in the second attachment step (95) (see FIG. 13A) and the case where there is a circumferential displacement of the workpiece (35) in the second attachment step (95) (see FIG. 13B), a displacement amount E of the specific helical groove (40a) in the direction in which the center axis 33 of the workpiece 35 extends in the cross section illustrated in FIG. 12 is $(C_{2M} - C_{1M})$ ($E = C_{2M} - C_{1M}$).

The helical grooves (40) of the screw rotor (30) are grooves each of which extends in a helical manner from the first end (31) side toward the second end (32) side of the screw rotor (30). When the screw rotor (30) is designed, the inclination angle of each of the helical grooves (40) with respect to the direction in which the center axis (33) of the screw rotor (30) extends is determined. Thus, there is a correlation between the position of a cross section of each of the helical grooves (40) in the direction in which the center axis (33) of the screw rotor (30) extends and the rotational angle of the screw rotor (30), the correlation being determined from the design values of the screw rotor (30). Therefore, the displacement angle θ of the workpiece is calculated by using this correlation and the displacement amount E of the specific helical groove (40a) in the direction in which the center axis (33) of the workpiece (35) extends.

In the correction step (97), the machining origin in the first finishing step (92) is corrected on the basis of the calculated displacement angle θ of the workpiece (35). In the case illustrated in FIG. 13A and FIG. 13B, the machining origin in the first finishing step (92) is corrected to a machining origin on the assumption that the workpiece (35) is rotated by the displacement angle θ in the counterclockwise direction in FIG. 13A and FIG. 13B.

Second Finishing Step

In the second finishing step (98), the workpiece (35) having the second end (32) attached to the holder (61) of the machine tool (60) is subjected to cutting to form the second portions (42) of the helical grooves (40) such that the shape of each of the second portions (42) meets the design values of the screw rotor (30). In the second finishing step (98), rough machining, semi-finishing, and finishing are sequentially performed. In addition, the cutting in the second finishing step (98) is performed on the basis of the machining origin corrected in the correction step (97).

Here, even with the performance of the correction step (97), it is practically impossible to completely eliminate the positional errors of the first portion (41) and the second portion (42) of each of the helical grooves (40). Thus, in the workpiece (35) that has undergone the second finishing step (98) (i.e., the screw rotor (30) as the finished product), each of the helical grooves (40) has slight steps formed on the wall surfaces (46, 47, 48), the slight steps constituting the boundary line (43) between the first portion (41) and the second portion (42).

Feature of Embodiment (1)

In the method for manufacturing the screw rotor (30) of the present embodiment, the second finishing step (98) is performed after the first finishing step (92).

In the first finishing step (92), cutting is performed on the workpiece (35) having the first end (31) attached to the holder (61) of the machine tool (60) so as to form the first portions (41) of the helical grooves (40). Thus, in the first finishing step (92), the holder (61) holding the workpiece (35) is kept away from the structure of the machine tool (60) other than the holder (61) (specifically, the rotary spindle (62) to which the cutting tool is attached).

In the second finishing step (98), cutting is performed on the workpiece (35) having the second end (32) attached to the holder (61) of the machine tool (60) so as to form the second portions (42) of the helical grooves (40). Thus, in the second finishing step (98), the holder (61) holding the workpiece (35) is kept away from the structure of the machine tool (60) other than the holder (61).

Thus, according to the manufacturing method of the present embodiment, even in the case where the screw rotor (30) is machined by using the machine tool (60) having a general structure, the entire helical grooves (40) of the screw rotor (30) can be machined while the holder (61) holding the workpiece (35) is kept away from the structure of the machine tool (60) other than the holder (61).

Feature of Embodiment (2)

In the method for manufacturing the screw rotor (30) according to the present embodiment, the first measurement step (93) is performed between the first finishing step (92) and the second detachment step (94), and the second measurement step (96) and the correction step (97) are sequentially performed between the second attachment step (95) and the second finishing step (98).

In the correction step (97), the displacement angle of the workpiece (35) is calculated on the basis of the position of the first portion (41) measured in the first measurement step (93) and the position of the first portion (41) measured in the second measurement step (96). In addition, in the correction step (97), the machining origin in the first finishing step (92) is corrected on the basis of the calculated displacement angle. In the second finishing step (98), cutting is performed on the basis of the machining origin corrected in the correction step (97) to form the second portions (42) of the helical grooves (40). Thus, the relative positional error between the first portion (41) and the second portion (42) of each of the helical grooves (40) is minimized to a small value. As a result, in each of the helical grooves (40), the steps constituting the boundary line (43) between the first portion (41) and the second portion (42) can be kept small.

Feature of Embodiment (3)

The helical grooves (40) of the screw rotor (30) are grooves each of which extends in a helical manner from the first end (31) side toward the second end (32) side of the screw rotor (30). When the screw rotor (30) is designed, the inclination angle of each of the helical grooves (40) with respect to the direction in which the center axis (33) of the screw rotor (30) extends is determined. Thus, there is a correlation between the position of a cross section of each of the helical grooves (40) in the direction in which the center axis (33) of the screw rotor (30) extends and the rotational angle of the screw rotor (30), the correlation being determined from the design values of the screw rotor (30). This correlation is unique to the screw rotor (30) in which the helical grooves (40) are formed.

In the method for manufacturing the screw rotor (30) according to the present embodiment, the displacement angle θ of the workpiece (35) at the completion of the second attachment step (95) is calculated by using the above-mentioned correlation, which is determined from the design values of the screw rotor (30). Thus, the displacement angle θ can be calculated with relatively high accuracy, which allows the relative positional error between the first portion (41) and the second portion (42) of each of the helical grooves (40) to be kept small.

Feature of Embodiment (4)

In each of the helical grooves (40) of the screw rotor (30) manufactured by the manufacturing method according to the present embodiment, the boundary line (43) between the first portion (41) and the second portion (42) is formed at a position relatively close to the suction-side end (45) of the helical groove (40). More specifically, in each of the helical grooves (40) of the screw rotor (30) of the present embodiment, the boundary line (43) between the first portion (41) and the second portion (42) is formed at a position closer to the suction-side end (45) than the center of the helical groove (40) in the direction in which the helical groove (40) extends.

The boundary line (43) between the first portion (41) and the second portion (42) a slight step. Thus, when one of the gates (52) of one of the gate rotors (51) passes through the boundary line (43) while sliding along the wall surfaces (46, 47, 48) of one of the helical grooves (40), there is a possibility that the sealing between the wall surfaces (46, 47, 48) of the helical groove (40) and the gate (52) may be insufficient.

In contrast, the gate (52) is located relatively close to the suction-side end (45) of the helical groove (40) during an early stage of compression stroke in the compression chambers (21, 22). In the early stage of the compression stroke, the pressure of the refrigerant in the compression chambers (21, 22) has not yet increased significantly with respect to the pressure of the refrigerant that is drawn into the compression chambers (21, 22). Thus, even if the sealing between the wall surfaces (46, 47, 48) of the helical groove (40) and the gate (52) is insufficient in the early stage of the compression stroke, the amount of the refrigerant that leaks from the compression chambers (21, 22) is very small.

Therefore, even in the case where the first portion (41) and the second portion (42) of each of the helical grooves (40) of the screw rotor (30) are individually machined in the manufacturing method according to the present embodiment, the amount of the refrigerant that leaks from the compression chambers (21, 22) of the screw compressor (10) can be kept small, and the efficiency of the screw compressor (10) can be kept high.

Feature of Embodiment (5)

In the screw rotor (30) manufactured by the manufacturing method according to the present embodiment, the boundary line (43) formed on the wall surfaces of each of the helical grooves (40) is inclined with respect to the line of intersection of the wall surfaces (46, 47, 48) of the helical groove (40) and the seal plane (55). Thus, during the process in which one of the gates (52) crosses the boundary line (43) of one of the helical grooves (40) by moving from the second portion (42) toward the first portion (41), the seal lines (53) of the gate (52), which move relatively from the suction-side end (45) to the discharge-side end (44) of the helical groove (40), each intersect the boundary line (43) at a single point (see FIG. 5).

In each of the helical grooves (40) of the screw rotor (30) of the present embodiment, the boundary line (43) between the first portion (41) and the second portion (42) is a slight step. Thus, if the boundary line (43) is formed on the "line of intersection of the wall surfaces (46, 47, 48) of the helical groove (40) and the seal plane (55)", during the process in which one of the gates (52) crosses the boundary line (43) of the helical groove (40) by moving inside the helical groove (40) from the second portion (42) toward the first portion (41), the entire seal lines (53) of the gate (52) simultaneously pass through the boundary line (43) which is a step. If the entire seal lines (53) simultaneously pass through the boundary line (43), there is a possibility that an impact force may act on the seal lines (53) of the gate (52), potentially causing damage to the gate (52).

In contrast, in the screw rotor (30) of the present embodiment, the boundary line (43) between the first portion (41) and the second portion (42) of each of the helical grooves (40) intersects, at one point, the seal lines (53) of one of the gates (52) passing through the boundary line (43) by moving from the suction-side end (45) toward the discharge-side end (44) of the helical groove (40). Thus, the force that acts on the gate (52) during the process in which the gate (52) crosses the boundary line (43) between the first portion (41) and the second portion (42) can be kept small, thereby reducing the possibility of damage to the gate (52) and maintaining high reliability of the screw compressor (10).

Modifications of Embodiment

A screw rotor having a shape in which a suction-side end of each helical groove is opened at a first end of the screw rotor may be manufactured by the manufacturing method according to the present embodiment.

In addition, the screw rotor manufactured by the manufacturing method according to the present embodiment may be provided in a screw compressor that performs single-stage compression.

Although the embodiment and the modifications have been described above, it is to be understood that various modifications can be made to the embodiment and the details without departing from the gist and the scope of the claims. In addition, the elements according to the above-described embodiment, modifications, and other embodiments may be appropriately combined or replaced. Furthermore, in the specification and the claims, the terms "first", "second", "third", and the like are used to distinguish between the terms to which they refer, and are not intended to limit the number or order of those terms.

As described above, the present disclosure is useful for a method for manufacturing a screw rotor, a screw rotor, and a screw compressor.

The invention claimed is:

1. A method for manufacturing a screw rotor for a screw compressor by forming a plurality of helical grooves in a workpiece having a cylindrical shape, each of the plurality of helical grooves being divided into a first portion including an end portion on a first end side of the workpiece and a second portion including an end portion on a second end side of the workpiece, the method comprising:
    a first attachment step of attaching a first end of the workpiece to a holder of a machine tool;
    a first finishing step of finishing the first portion of each of the plurality of helical grooves by cutting after completion of the first attachment step;
    a detachment step of detaching the workpiece from the holder after completion of the first finishing step;
    a second attachment step of attaching a second end of the workpiece detached from the holder in the detachment step to the holder; and
    a second finishing step of finishing the second portion of each of the plurality of helical grooves by cutting after completion of the second attachment step.

2. The method for manufacturing the screw rotor according to claim 1, wherein one of the plurality of helical grooves is defined as a specific helical groove, the method further comprising:
    a first measurement step of measuring a position of the first portion of the specific helical groove in a direction in which a center axis of the workpiece extends after completion of the first finishing step and before the detachment step is started;
    a second measurement step of measuring a position of the first portion of the specific helical groove in a direction in which a center axis of the workpiece extends after completion of the second attachment step and before the second finishing step is started; and
    a correction step of
        calculating, based on a position of the first portion measured in the first measurement step and a position of the first portion measured in the second measurement step, a displacement angle that is an angle around a center axis of the workpiece and that indicates an amount of change in a circumferential position of the workpiece at completion of the second attachment step relative to a circumferential position of the workpiece at completion of the first finishing step, and
        correcting a machining origin in the first finishing step by using the calculated displacement angle,
    in the second finishing step, cutting being performed based on a machining origin corrected in the correction step.

3. The method for manufacturing the screw rotor according to claim 2, wherein in the correction step, the displacement angle is calculated by using a correlation between a position of each of the helical grooves in a direction in which a center axis of the screw rotor extends and a rotational angle of the screw rotor, the correlation being determined from
a design value of the screw rotor,
a position of the first portion measured in the first measurement step, and
a position of the first portion measured in the second measurement step.

4. The method for manufacturing the screw rotor according to claim 3, wherein
in each of the plurality of helical grooves, a length of the first portion in a direction in which the helical groove extends is longer than a length of the second portion in the direction in which the helical groove extends.

5. The method for manufacturing the screw rotor according to claim 4, wherein
in each of the plurality of helical grooves, the first portion includes a discharge-side end of the helical groove, and
in each of the plurality of helical grooves, the second portion includes a suction-side end of the helical groove.

6. The method for manufacturing the screw rotor according to claim 2, wherein
in each of the plurality of helical grooves, a length of the first portion in a direction in which the helical groove extends is longer than a length of the second portion in the direction in which the helical groove extends.

7. The method for manufacturing the screw rotor according to claim 6, wherein
in each of the plurality of helical grooves, the first portion includes a discharge-side end of the helical groove, and
in each of the plurality of helical grooves, the second portion includes a suction-side end of the helical groove.

8. The method for manufacturing the screw rotor according to claim 1, wherein
in each of the plurality of helical grooves, a length of the first portion in a direction in which the helical groove extends is longer than a length of the second portion in the direction in which the helical groove extends.

9. The method for manufacturing the screw rotor according to claim 8, wherein
in each of the plurality of helical grooves, the first portion includes a discharge-side end of the helical groove, and
in each of the plurality of helical grooves, the second portion includes a suction-side end of the helical groove.

* * * * *